United States Patent [19]
Rabe et al.

[11] Patent Number: 5,664,122
[45] Date of Patent: Sep. 2, 1997

[54] METHOD AND APPARATUS FOR SEQUENCING BUFFERS FOR FAST TRANSFER OF DATA BETWEEN BUSES

[75] Inventors: Jeffrey L. Rabe, Gold River; Sathyamurthi Sadhasivan, El Dorado Hills, both of Calif.

[73] Assignee: Intel Corporation, Santa Clara, Calif.

[21] Appl. No.: 619,092

[22] Filed: Mar. 20, 1996

Related U.S. Application Data

[63] Continuation of Ser. No. 447,190, May 22, 1995, abandoned, which is a continuation of Ser. No. 152,303, Nov. 12, 1993, abandoned.

[51] Int. Cl.$^6$ .............................. G06F 12/00; G06F 13/00
[52] U.S. Cl. ..................... 395/308; 395/306; 395/873
[58] Field of Search ........................... 395/306, 308, 395/250; 370/85.13

[56] References Cited

U.S. PATENT DOCUMENTS

| | | | |
|---|---|---|---|
| 5,117,486 | 5/1992 | Clark et al. | 395/250 |
| 5,247,616 | 9/1993 | Berggren | 395/200 |
| 5,274,763 | 12/1993 | Banks | 395/250 |
| 5,325,499 | 6/1994 | Kummer et al. | 395/425 |

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A buffer circuit for transferring data between a first slower narrower computer bus and a second wider faster computer bus which buffer circuit includes first and second buffers each capable of storing a plurality of bytes of data equivalent to the width of the second bus, a single address register for holding an address which represents data in either of the two buffers, the lowest order bit of the address register indicating to which one of the two buffers data is being written, first and second registers for storing indications of valid data in the first and second buffers, and a control circuit for controlling the filling of the first and the second buffers in accordance with the byte addresses furnished and the flushing of the first and the second buffers whenever a most significant byte of a buffer has valid data, whenever an attempt is made to write to a buffer address containing valid data, and whenever an attempt is made to load data to a buffer address different than an address in the address register so that sequences of bytes of data are typically accumulated in order in one buffer until an amount of data equal to that which may be transferred on the second wider faster bus is accumulated and then that buffer is flushed to the second wider faster bus while the other buffer is loaded with new data, and so that valid data is not overwritten even though non-sequential addresses are loaded.

6 Claims, 5 Drawing Sheets

METHOD AND APPARATUS FOR SEQUENCING BUFFERS FOR FAST TRANSFER OF DATA BETWEEN BUSES

This is a continuation of application Ser. No. 08/447,190, filed May 22, 1995, now abandoned, which is a continuation of application Ser. No. 08/152,303, filed Nov. 12, 1993 now abandoned.

BACKGROUND OF THE INVENTION

1. Field of the Invention

This invention relates to computer systems, and more particularly, to methods and apparatus for accelerating the writing of data from a slow bus to a fast bus.

2. History of the Prior Art

Historically, personal computers have utilized a single bus to transfer data between different internal components of the system. In personal computers using central processing units (CPUs) designed and manufactured by Intel Corporation of Santa Clara, Calif., such buses have typically been designed as either an Industry Standard Association (ISA) bus or an Expanded Industry Standard Association (EISA) bus. The ISA bus is a sixteen bit data bus while the EISA bus is thirty-two bits wide. Both the ISA bus and the EISA bus typically operate at a frequency just over eight megahertz. These bus widths and the rates at which each of these buses is capable of operating have limited the speed at which a computer can operate so there have been a number of attempts to increase bus speed.

One recently implemented method of increasing bus speed is to provide an additional, so called, "local bus" which is more closely associated with the central processor than either of the above-mentioned buses and which is capable of running at speeds closer to the speeds at which the processor itself runs. Those system components which require faster operation than has been available using the slower buses (such as an output display card driving an output display device) are joined to this faster local bus. The slower ISA or EISA bus is continued in essentially unchanged form as a secondary bus, and those components which are able to tolerate longer access times are associated with the slower bus. Although the theory behind using a local bus is good, many local bus designs have actually slowed the operation of the computer in some respects.

Intel Corporation has designed a new local bus which may be associated in a computer system both with an Intel processor and with other buses such as an ISA bus or an EISA bus (each of which is hereinafter referred to broadly as a secondary bus). This new local bus is able to transfer data more rapidly for selected components of the system without the conflicts and bottlenecks which arise using other local bus systems. This new bus is referred to as the "peripheral component interconnect" (PCI) bus. The PCI bus is thirty-two bits wide and is capable of operating at either twenty-five or thirty-three megahertz.

A computer system using the PCI bus includes, in addition to the physical PCI bus, a first circuit, referred to as a "bridge" circuit, which controls the transfer of data between the PCI bus, the central processing unit, and main memory. A second bridge circuit is also arranged to control the transfer of data between the secondary bus and the PCI bus. Thus, the arrangement is such that components on the PCI bus utilize the first bridge in transfers of data involving the central processor or main memory. On the other hand, components on the secondary bus utilize the second bridge circuit, the PCI bus, and the first bridge in transfers of data involving the central processor or main memory; and utilize the second bridge and the PCI bus in transfers of data involving the components on the PCI bus.

Modern computer systems have also attempted to utilize bus masters to speed the operation of the system. A bus master is a component capable of originating and controlling the transfer of data on a bus. Typically a bus master includes a bus controller and operates on its own internal clock. Bus masters may be associated with either the PCI bus or the secondary bus in a computer system using a PCI bus. A peculiarity of the ISA and the EISA buses is that once a bus master (such as a DMA unit) has gained control of the bus, it cannot be forced off the bus until it has completed its operation. When the secondary bus master has gained access to the secondary bus in an operation which involves the PCI bus, the secondary bus master cannot be forced off the PCI bus until it has completed its operation. In such a case, since the secondary bus master cannot be forced to relinquish control of either the secondary or the PCI bus until it has completed its operation, operations on the PCI bus must be stopped until the operation on the secondary bus has been completed. Since the rate of transfer on the ISA bus is either one-sixth or one-eighth the rate of transfer on the PCI bus depending on the PCI bus rate, it is very desirable that the bridge circuitry joining these two buses transfer data from the slower secondary bus to the faster PCI bus as swiftly as possible so that the PCI bus will not be slowed to the operational speed of the slower secondary bus.

SUMMARY OF THE INVENTION

It is, therefore, an object of the present invention to provide bridge circuitry for accomplishing the rapid transfer of data from a slower to a faster busing system.

It is another more specific object of the present invention to provide a bridge circuit which allows the assembly of data from a slower narrower bus and the rapid transfer of that assembled data to a faster wider bus.

These and other objects of the present invention are realized in a buffer circuit for transferring data between a first slower narrower computer bus and a second wider faster computer bus which buffer circuit includes first and second buffers each capable of storing a plurality of bytes of data equivalent to the width of the second bus, a single address register for holding an address which represents data in either of the two buffers, the lowest order bit of the address register indicating to which one of the two buffers data is being written, first and second registers for storing indications of valid data in the first and second buffers, and a control circuit for controlling the filling of the first and the second buffers in accordance with the byte addresses furnished and the flushing of the first and the second buffers whenever a most significant byte of a buffer has valid data, whenever an attempt is made to write to a buffer address containing valid data, and whenever an attempt is made to load data to a buffer address different than an address in the address register so that sequences of bytes of data are typically accumulated in order in one buffer until an amount of data equal to that which may be transferred on the second wider faster bus is accumulated and then that buffer is flushed to the second wider faster bus while the other buffer is loaded with new data, and so that valid data is not overwritten even though non-sequential addresses are loaded.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiting physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
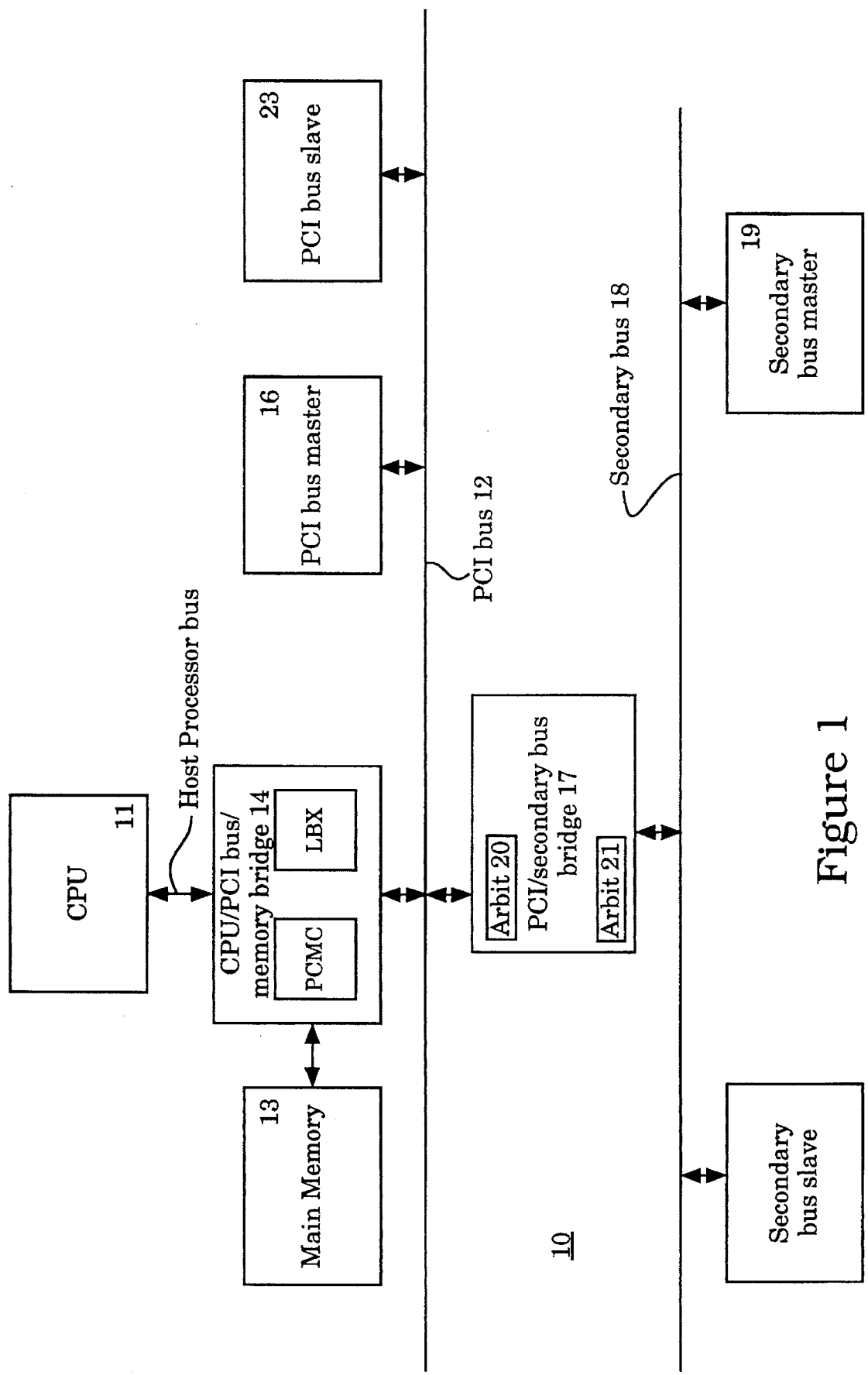
FIG. 1 is a block diagram of a computer system which may utilize the present invention.

Referring now to FIG. 1, there is illustrated a computer system 10. The system 10 includes a central processor 11 such as an Intel i486™ microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is physically constructed to include both a cache and dram controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation. In addition to various functions such as cache control and data synchronization which are not important to the present invention, the bridge circuit 14 includes circuitry for controlling and accomplishing the transfer of data among the CPU 11, main memory 13, and the PCI bus 12.

The PCI bus 12 provides access to components associated therewith such as a PCI bus slave circuit 15 which may be a video output card which includes a frame buffer adapted to store video signals to be transferred to an output device such as a monitor for display. A PCI bus master circuit 16 may also be connected to the PCI bus 12. The main properties of a PCI bus master are that it includes a bus controller which functions at some internal clock rate and that it may initiate and control operations on the PCI bus 12.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus or a EISA bus either of which operates at a slower data transfer rate than the PCI bus 12. A specific PCI to ISA bus bridge circuit 17 is a part of an integrated circuit chip referred to as a "system input/output" (SIO) circuit manufactured by Intel Corporation. Such a bridge is described in detail in a publication entitled *82420/82430 PCIset ISA and EISA Bridges*, published by Intel Corporation. Such a bridge circuit 17 includes circuitry for providing the interface between the PCI bus 12 and the secondary bus 18 which allows data to be transferred therebetween. The bridge circuit 17 provides circuitry which allows it to operate as an intercoupling bus master or as a bus slave on the PCI bus 12. The ability of the bridge circuit 17 to act as a PCI bus master allows a bus master circuit 19 positioned on the secondary bus 18 (for example, local area network circuitry) to gain access to the PCI bus 12 and thence to the main memory. The SIO chip which includes the bridge circuit 17 also includes a first arbiter circuit 20 for controlling access to the PCI bus 12 and a second arbiter circuit 21 for controlling access to the secondary bus 18.

Figure 2:
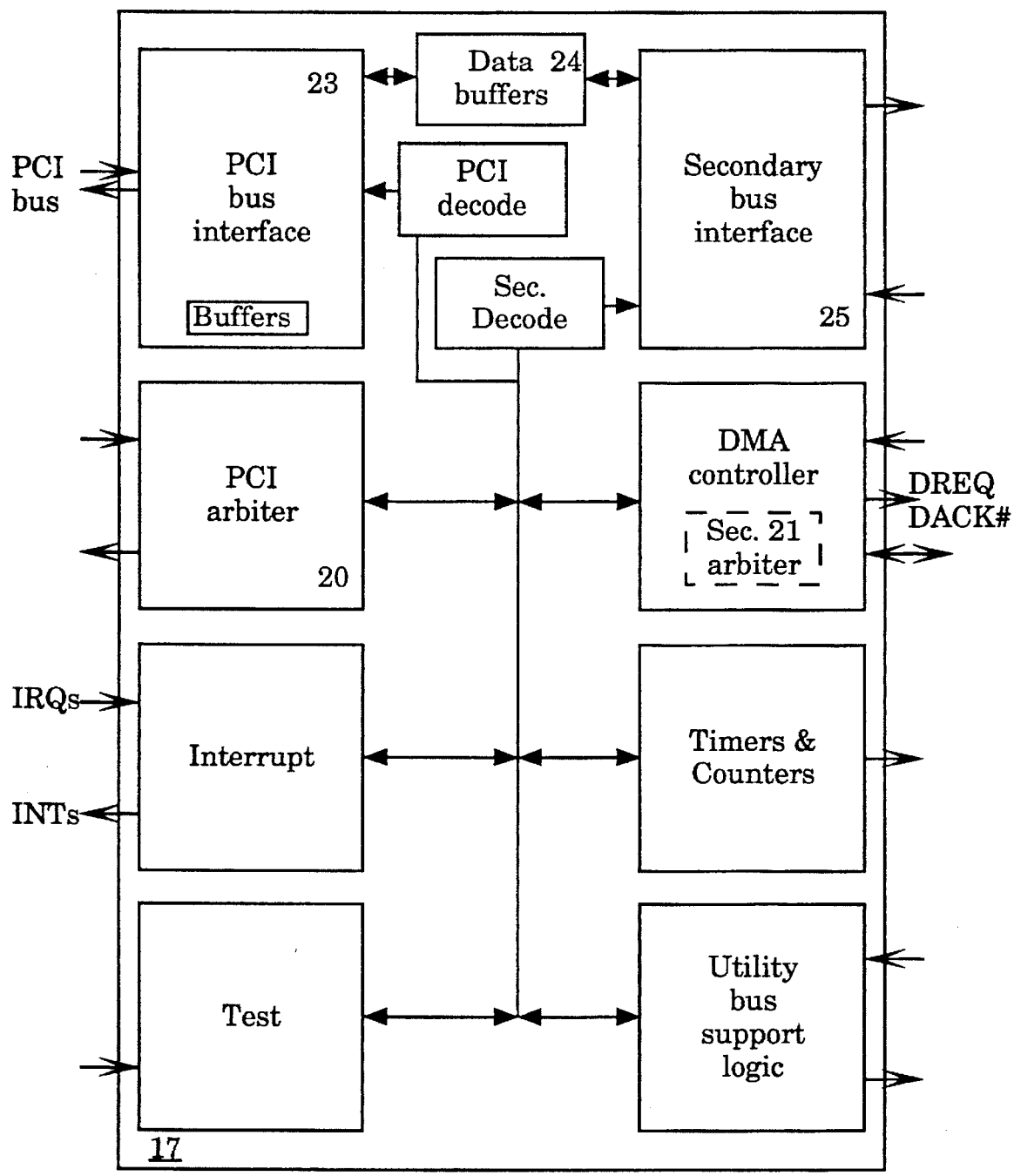
FIG. 2 is a block diagram of a bridge circuit shown in FIG. 1 which may utilize the present invention.

FIG. 2 is a block diagram which illustrates the component circuits of a SIO (82378IB) chip which includes a bridge circuit 17. The SIO chip includes a PCI bus interface circuit 23 which transfers data between the bridge circuit 17 and the PCI bus 12, a PCI bus arbiter 20 which arbitrates access to the PCI bus, a pair of address decoder circuits (PCI decode and Secondary decode) for decoding PCI initiated and ISA initiated addresses, a secondary bus interface circuit 25, data buffers 24 for storing data including data transferred by the bridge circuit 17 from the secondary bus, a DMA unit which may include the physical components of an ISA bus arbiter 21, and various other circuits which are utilized for operations but are not important to the present invention. It should be noted that the PCI bus interface unit 23 includes a set of buffers which are adapted to store data being transferred from the ISA bus to the PCI bus while arbitration by the PCI arbiter circuit 20 is being conducted.

One way in which the operation of a computer system using the PCI bus 12 is made faster is that operations on the PCI bus 12 and operations on the ISA bus 18 may take place at the same time so long as the operations on either bus are limited to that particular bus. The PCI bus 12, the arbitration unit 20, and the bridge circuits 14 and 17 have been designed particularly with this purpose in mind to allow concurrent operations by bus masters on the PCI bus 12 and on the secondary bus.

Unfortunately, neither the ISA bus nor the EISA bus is as modern as the PCI bus. Neither bus was designed to allow concurrent use by a plurality of processors. Instead, whenever a bus master on one of these secondary buses gains control of its bus, it cannot be forced to relinquish the bus until its operation has been completed. When this operation by a secondary bus master also involves the PCI bus, the PCI bus is similarly slowed to the speed of transfer of the slower secondary bus. As mentioned above, the ISA bus is designed to operate at approximately eight megahertz while the PCI bus 12 is designed to operate at either twenty-five or thirty-three megahertz. The ISA bus is sixteen bits wide while the PCI bus is thirty-two bits wide. Thus at its slowest, the PCI bus handles data at six times the rate at which data is handled by the ISA bus. For this and other reasons, it is especially desirable that the bridge circuit 17 provide for very rapid transfer of data from the secondary bus 18 to the PCI bus 12.

Figure 3:
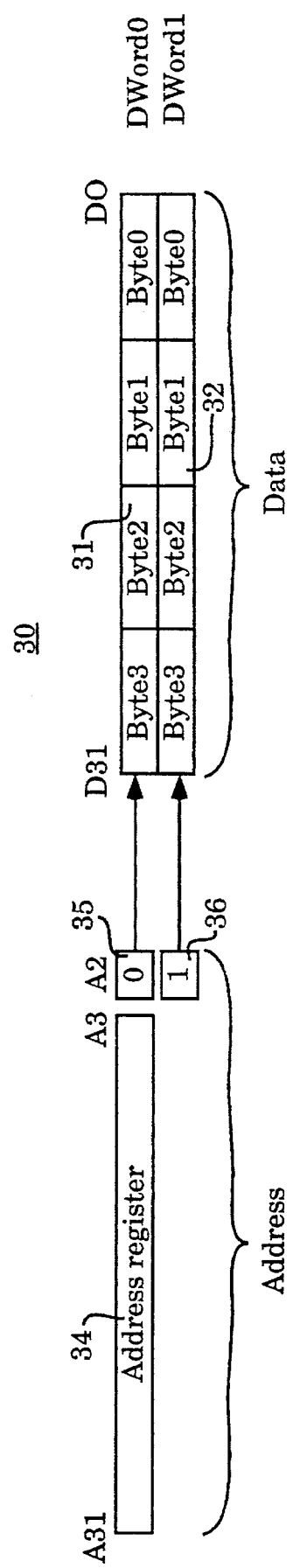
FIG. 3 is a block diagram illustrating a portion of the bridge circuit shown in FIG. 2.

The present invention enhances the design of certain of the buffers included within the data buffers 24 so that they are especially adapted to accomplish rapid transfer of data being written from the secondary bus 18 to the PCI bus 12. FIG. 3 illustrates such an enhanced buffer design in general outline appropriate for the description of the invention. The buffer circuit 30 illustrated in FIG. 3 includes a first data buffer 31 and a second data buffer 32. Each of these data buffers 31 and 32 in the embodiment illustrated includes memory positions sufficient to hold one double word of thirty-two bits. Each of the buffers 31 and 32 may be individually written on a byte basis as well as on a word basis. This allows write operations of individual bytes to be accumulated in the buffers from the slower ISA bus before transfer to the faster PCI bus. Thus, arbitration need only occur once rather than four times to transfer a double word of data to the PCI bus 12.

Associated with each of the two data buffers 31 and 32 is an address register 34 which stores all but the lowest three bits of address information (twenty-nine most significant bits of address data in one embodiment). These most significant bits completely designate all but the lowest order bit of a double word address. The next lowest order bit is represented separately in either of bit registers 35 and 36. Two one bit registers 35 and 36 are shown in the figure to better illustrate how the bit is utilized; in practice, the bit may be included in register 34. Bit register 35 is associated with and designates data with a bit address of zero which is to be stored in the buffer 31. The bit register 36 is associated with and designates a double word of data with a bit address of one which is to be stored in the buffer 32. Thus, it will be recognized that every other double word address has a zero in its lowest order bit (third lowest in a byte address). Since four bytes appear in each double word, a first double word will be stored in one of buffers 31 or 32 while the next sequential double word will be stored in the other of buffers 31 or 32. In the addressing system used with Intel processors, the individual bytes of each double word are designated by two additional bits appended as least significant bits to the double word address to the right of the bit held in register 35 or 36.

Thus, the buffer circuit 30 of FIG. 3 uses only a single address register 34 for addressing each of the two buffers 31 and 32 since in storing sequential double words, all of the bits of the double word addresses greater than the least significant bit will be the same. Thus, an ISA bus master such as a DMA controller may cause data to be read from an ISA bus slave to a first one of the two buffers 31 and 32. Presuming that the data includes a number of sequential bytes of data and presuming that the first byte is in a double word having a zero as its lowest order double word address bit, that first byte will be stored in the buffer 31 at the byte position designated by the two least significant bits of the byte address. The next sequential byte will be stored in the next byte position in the buffers 31 and 32. If this byte is in the same double word, then it will be stored in the next byte position in the buffer 31. If this byte is the first byte of the next double word, it will be stored in the first byte position (byte 0) of the second buffer 32. In any case, the filling of the first buffer 31 continues until the buffer is full, presuming data at enough sequential byte addresses is being written to fill the buffer. When the first buffer 31 has been filled, the least significant bit (third in the entire byte address) in the double word address changes; and the bytes of data begin to be written to the other data buffer 32 where the buffer 31 was the starting buffer.

While the data is being written to the buffer 32, the data which has been loaded into the first buffer 31 may be transferred out of that buffer (flushed) to the PCI interface buffer (mentioned above) in the PCI interface unit 23. Thus, the arrangement illustrated provides that write operations to the buffer circuitry 30 from the secondary bus and flushing operations for transferring data from the buffer circuitry 30 to the PCI interface buffer may take place concurrently so long as the PCI interface buffer is available to store data. Moreover, loading the buffer circuitry 30 typically takes place a byte at a time until an entire double word has been accumulated; then the entire double word is flushed in parallel to the PCI interface buffer. Since the PCI bus 12 operates at a data transfer rate which is six or eight times as fast as the transfer rate of the ISA bus, the PCI interface buffer will typically be available; and the transfer of data is greatly accelerated and sustained.

If the PCI interface buffer does not have room for the data in the second of the two double word buffers 32 after the first buffer 31 has been written to the PCI interface buffer, then the operation of receiving data from the secondary bus must be stalled until the data in the buffer 32 can be written to the PCI interface buffer even though the first double word buffer 31 has been emptied. This occurs because there is only one address register to hold the two addresses for data in both of the buffers 31 and 32. The address of the data in the buffer 32 must be maintained and not be overwritten until this data can be written to the PCI interface buffer.

There are three conditions under which the transfer of data to the PCI interface buffers occurs. The first condition is when the buffer 31 is full and sequential data is to be written to the next buffer. The data in the filled buffer is written to the PCI interface buffer, and the next byte of data is written to the next of the two buffers 31 or 32. Data is also written to the PCI interface buffer when the address to which a next byte of data is to be written is a byte address which falls within a buffer to which data has already been written and to a byte which has already been written. This may occur where a secondary bus master is writing non-sequential addresses and the double word address of the new data has a lowest order bit equal to that at which the last byte was written. In such a case, the new data (if allowed) would write over the data which has not yet been transferred and destroy that data. Consequently, the operation of writing to the buffer must halt; and the data in the buffer must be written the PCI interface buffer for transfer to the PCI bus 12 before more data is written. It is obvious that in such a situation concurrent filling and emptying of the buffers 31 and 32 cannot occur.

The third condition under which a buffer is flushed is when a write has been completed to a byte other than the last byte of the first buffer (e.g., buffer 31) and the next byte to be written is addressed to a byte in the other buffer (e.g., buffer 32). In such a case, the data in the first buffer must be flushed since an address change has occurred and a failure to flush the buffer would not provide space for the following double word to be written.

Although there are certain conditions which have been described in which concurrent operation cannot take place because writing must be stalled, in most situations the PCI bus operation occurs so much more rapidly that, for sequential data, no delay of operation waiting for the PCI interface buffer will occur. Consequently, the use of the present invention greatly speeds the operation of a system utilizing a pair of buses which, in general, operate at different speeds and have different bus widths.

Figure 4:
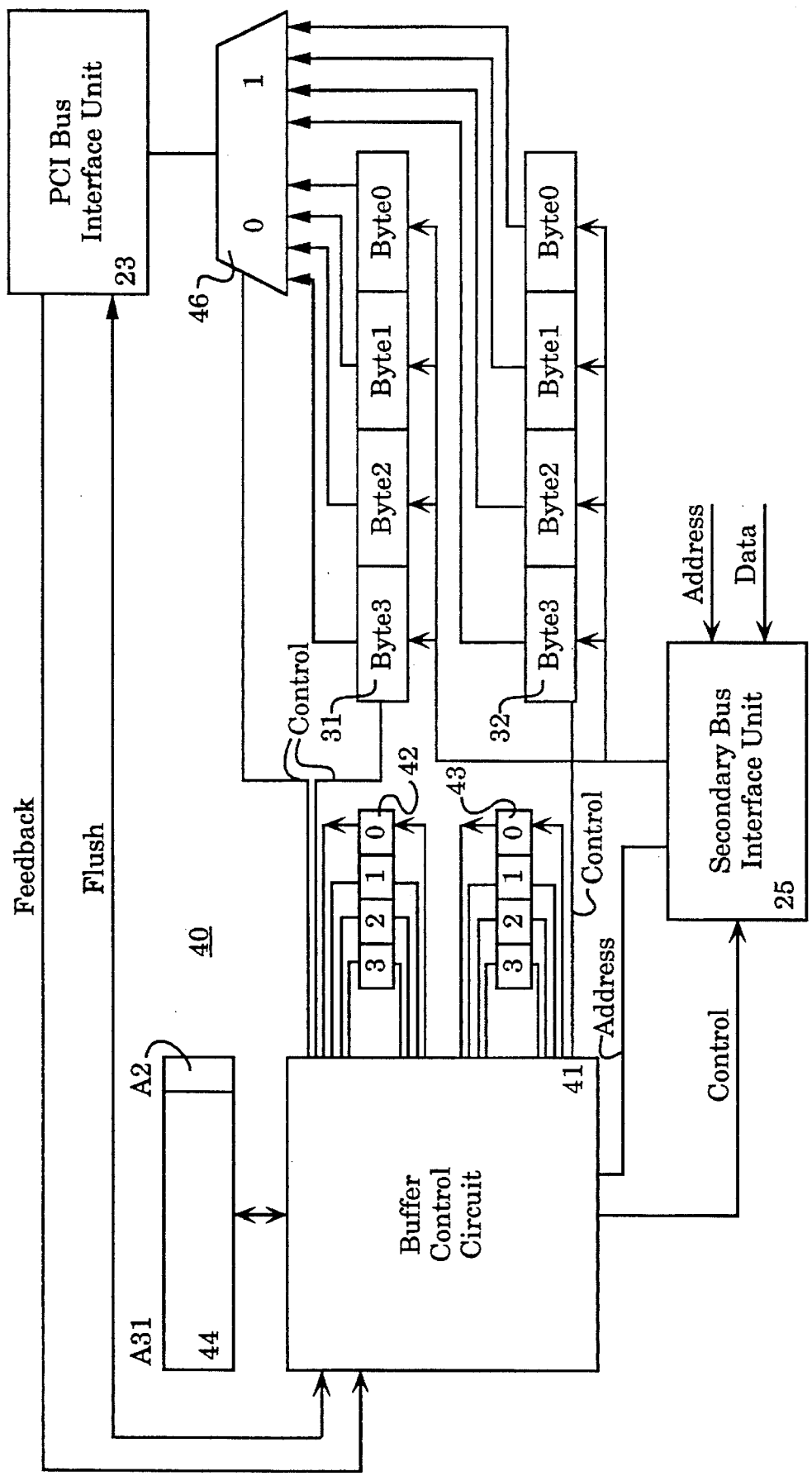
FIG. 4 is a more detailed block diagram illustrating a portion of the bridge circuit shown in FIG. 2.

FIG. 4 illustrates in more detail the circuitry of the present invention by which its desirable features are accomplished. As is illustrated in FIG. 4, the circuit 40 includes a buffer control circuit 41 which may be a state machine designed in a manner well known to those skilled in the prior art. The buffer control circuit 41 implements the rules set out above for controlling the buffers to transfer data from the secondary bus 18 to the PCI bus 12. Associated with the buffer control circuit 41 are a pair of four bit registers 42 and 43. The buffers 42 and 43 are arranged to store a bit designating each byte of the buffers 31 and 32 to which a valid byte of data has been written. The register 42 may be arranged to store bits representing the validity of data in the buffer 31, and the register 43 may be arranged to store bits representing the validity of data in the buffer 32. The bits of the registers 42 and 43 are set as each byte of data is written to the associated buffer 31 and 32 and are erased as each byte of data is flushed and written to the PCI interface buffer. By assessing the condition of these bits, the buffer control circuit 41 knows whether a byte in one of the buffers 31 or 32 contains valid data which should not be overwritten until it has been flushed to the PCI interface buffer. These valid bits also allow the transfer of only valid data to the PCI interface buffers during flushing, for example, when less than all of the bytes of a buffer being flushed have been loaded with valid data.

Also associated with the buffer control circuit 41 is an address register 44 with a number of bit positions sufficient to store all of the bits of a double word address. The least significant bit (A2) stored in that register 44 is utilized to indicate to the buffer control circuit 41 to which of the two double word buffers 31 and 32 the data is being written. The circuit 40 also includes a multiplexor 46 which functions under control of the buffer control circuit 41 to transfer data to the PCI interface buffer of the PCI bus interface unit 23. An ISA (or secondary) bus interface unit 25 is illustrated for providing data and addresses to the circuit 40. The addresses are furnished to the buffer control circuit 41 which transfers the data from the interface unit 25 to the appropriate byte positions of the data buffers 31 and 32 in the manner described above. The buffer control circuit 41 provides control signals to the secondary interface unit 25 to select data and addresses when the selection is appropriate. The PCI interface unit 23 provides feedback signals to the buffer control circuit 41 to indicate the state of the PCI interface buffers including whether they are empty. A path is also provided between the PCI interface unit 23 and the buffer control circuit 41 for controlling the transfer of signals by which data is flushed from the buffers 31 and 32 and written to the PCI interface buffers.

Figure 5:
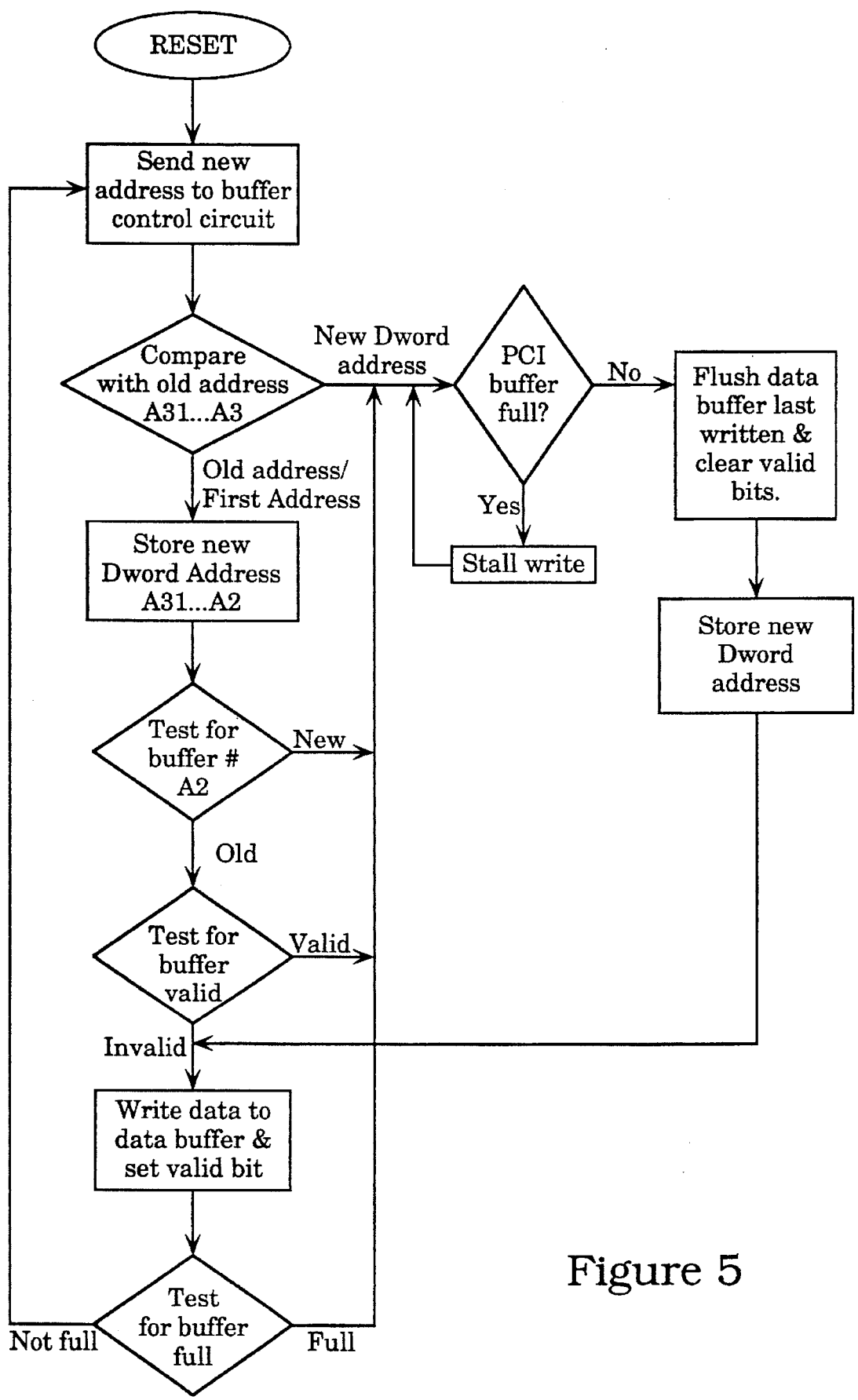
FIG. 5 is a flow chart illustrating a method of practicing the present invention.

FIG. 5 is a flow chart which illustrates the operation of the Circuit 40. The circuit 40 operates as follows. When the circuit 40 is reset, the buffers 31 and 32 require a control signal from the control circuit 41 in order to be placed in the operative condition in which they may transfer data from the secondary bus 18 to the PCI bus 12. When a transfer of data is to occur, the secondary interface circuit 25 provides an address to the buffer control circuit to indicate the address of the first byte of data which is to be transferred. This data may be read from a secondary bus slave typically in sequential bytes by a DMA controller unit or it may be written to the circuit 40 by a secondary bus master; in the latter case, the data need not be written to sequential addresses. The data may be written in byte or word segments.

Presuming that the data is written in sequential bytes, a first address is sent to the control circuit 41. This address designates the double word buffer being used and the byte in that buffer. For example, if the double word address carries a zero value in the least significant (A2) bit, then the byte will be written to the buffer 31 and to whichever byte is designated by the two lowest order bits (A0 and A1 bits). Thus, a first byte of data may be written to byte 0. The address for the double word is latched into the register 44, and a one value is set in the zero bit position of the register 42 as the data is written to indicate that the byte contains valid data which has not been flushed to the PCI interface buffer. When the address for the next sequential byte is received, no change needs to be made to the double word address in the register 44 since the next sequential byte is byte 1 of the same double word and is to be stored in the register 31. This byte position in the register 31 has the same double word address as the first byte 0. The data is written to the second byte position as indicated by the address bits A1 and A0, and the second bit (bit 1) of the register 42 is set to indicate that the second byte in register 31 now contains valid data. This process continues as sequential bytes are furnished.

After the byte 3 position in the buffer 31 has been written, the buffer 31 is considered to be filled. Then, before the next sequential byte is furnished, the control circuit 41 indicates to the PCI interface circuit 23 that there is data in the buffer 31 which is to be written to it. Presuming that the interface buffer of the PCI interface unit 23 is able to take the data, this is indicated to the control circuit 41; and the entire accumulated double word is transferred by the multiplexor 46 under control of the control circuit 41. Presuming that the PCI interface buffer is able to take the double word in the buffer 31, this double word of data is transferred to the PCI interface buffer; and the one values in each of the bit positions of the register 42 are set to zeroes to indicate that the data bytes are invalid. While the data in the buffer 31 is being written to the PCI interface unit 23, the control circuit 41 allows the secondary bus interface unit 25 to send the next sequential byte address in the sequence. Since the next double word address for the following four sequential bytes of data has the same address as the bytes in the buffer 31 except for the lowest order bit, each of these next sequential bytes may be sequentially written to the buffer 32 even before the buffer 31 is emptied. The lowest order bit (A2) of the new double word address, of course, indicates that the buffer 32 is to be used for the new data while the lower order byte address bits indicate the byte within the buffer 32. As each address is furnished to the circuit 41, the address in the register 44 continues to be the same with only the lowest bit changed to a one to indicate the buffer 32 is being written. As each byte of data is transferred to the buffer 32, the bit representing that byte in the register 43 is set to a one to indicate that valid data resides in that byte position.

If the PCI interface buffer is unable to take the double word in the buffer 31 when the buffer 31 is full, the PCI interface unit 23 indicates to the circuit 41 that the buffer is full. However, in the situation presumed where the buffer 32 is empty and sequential bytes are being written to the circuit 40, the control circuit 41 allows the secondary bus interface unit 25 to send the next sequential sequence of addresses up to four bytes. Since the next double word address for the following four sequential bytes of data have the same double word address except for the lowest order bit, each of these bytes may be sequentially written to the buffer 32 even though the buffer 31 is still full. The lowest order bit of course, indicates that the buffer 32 is to be filled while the byte address bits indicate the byte within the buffer 32. During the time in which the second buffer 32 is being written, it is most probable that the buffer 31 will be flushed to the PCI interface buffer since the PCI bus data transfer rate is so much faster than the secondary bus rates. The address for the data in the buffer 31 is still indicated by the upper bits of the double word address in the address register while the lowest order bit is determined from the fact that the data is in the buffer 31. If, when the buffer 32 is filled, the buffer 31 is still full, then the control circuit 41 sends a signal to the secondary bus interface unit 25 to stall the transfer of data until both of the buffers have been emptied. The unit is stalled until both buffers have been flushed because the address in the register 44 cannot be changed to a new double word address until the last double word having that address is being written to the PCI interface buffer.

When a sequence of bytes greater than the eight bytes which can be held by the two buffers 31 and 32 is being written and the PCI interface buffer is able to continually receive the data, as the last byte (byte 3) of the second buffer 32 fills, the control circuit 41 signals to the PCI interface unit 23 that the double word in the buffer 32 is ready to be written and receives back the indication that the PCI interface buffer is able to receive the data. The control circuit 41 then controls the multiplexor 46 to transfer the double word to the PCI interface buffer and sets each of the bits of the register 43 to zero. Simultaneously, the control unit 41 signals the secondary bus interface unit 25 that it is ready to receive data and receives the next sequential address. Since the data in the buffer 32 is being written to the PCI interface buffer, the address in the register 44 may be changed; and the write to the buffer 31 of the new data in the sequence may proceed.

In a case in which data is being written to the circuit 40 from a bus master on the secondary bus, the bytes of data need not be in sequence. Thus, an address may be stored in the register 44 for a first byte to be written to byte 0 of the register 31, the byte may be written to the buffer 31, and the valid bit stored in the register 42 for that byte. A next byte may be written to byte 2 of the register 31 and the valid bit set for that byte. This byte has the same double word address so the data is accumulated in the register 31. A next byte may be written to the byte 3 of the buffer 31 and its valid bit set. When the buffer 31 is full, it is flushed in the manner described. The control circuit 41 signals the interface unit 23 and receives back a signal indicating the condition of the interface unit buffer. Presuming the buffer is able to receive data, the double word in the buffer 31 is written to the PCI interface buffer. It should be noted that the multiplexor 46 is controlled to transfer only the valid data to the PCI interface buffer since the condition of the bits in the register 42 indicates which bytes of the double word are valid.

Presuming bytes 0 and 2 of buffer 31 have been written but not transferred to the PCI interface buffer, and the next byte to be written to the buffer 31 is a byte with the same address which address indicates that it should be stored in buffer 31 as byte 2, and since the bit in the byte 2 position of the register 42 is a one, it indicates that the buffer 31 contains valid data in that byte position. This causes the state machine of the control circuit 41 to stall the writing of the new byte 2 and flush the buffer 31 to the PCI interface buffer so that data is not lost.

Presuming that valid data exists in either of the buffers 31 or 32 which has not been written (or is not being written) to the PCI interface buffer at the present time, and data is presented to the circuit 41 which data is addressed to a double word address different in more than the lowest order bit, then the registers holding data must each be flushed to the PCI interface buffer before the address may be changed to write the new data. This flushing operation proceeds in the same manner as has been explained above.

Thus, it will be seen that the present invention provides for the accumulation and the rapid transfer of data between a pair of buses, such as the PCI bus and the ISA or EISA bus, which function at different data transfer rates without the loss of data so that the PCI bus or similar faster bus will be occupied with the transaction for as short a time as possible.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
   first and second buses, the first bus operating at a faster data rate relative to the second bus;
   a central processing unit (CPU);
   a main memory;
   a primary bridge circuit for transferring data between the CPU, the main memory, and the first bus;
   a secondary bridge circuit for transferring data between the first and second buses, the secondary bridge circuit including a first interface unit having an interface buffer coupled to the first bus; a second interface unit coupled to the second bus; and a data buffer circuit coupled to the first and second interface units, the data buffer circuit comprising:
      first and second buffers each having a plurality of data byte storage locations storing data from a plurality of components on the second bus;
      an address register storing a data address provided by the second interface unit and a single bit which changes independently of the data address, the single bit indicating that a data byte is to be written to the first buffer or to the second buffer, the single bit changing to an opposite value each time a next data address is stored in the address register, the next data address sometimes being sequential with respect the data address and sometimes not being sequential with respect to the data address;
      a register storing a pair of bits for indicating a data byte storage location of the first or second buffer to which the data byte is to be written;
      first and second registers each having a plurality of valid bits, each valid bit corresponding to a data byte storage location of the first and second buffers, respectively;

means for controlling the transfer of data from the secondary bus to the first or second buffer according to the data address provided by the second interface unit, and for flushing the first or second buffers when one of the data byte storage locations of the first or second buffer is filled, the data address changes, and the interface buffer is empty, or alternatively, when a valid bit corresponds to one of the data byte storage locations of the first or second buffer, the valid data byte is not stored in the interface buffer, and the data address changes by more than the single bit.

2. The computer system of claim 1 wherein the control means provides a signal to the second interface unit stalling the transfer of data when both the first and second buffers are full.

3. The computer system of claim 2 wherein the signal is provided only until both the first and second buffers have been flushed.

4. The computer system of claim 1 wherein the single bit comprises the third least significant bit of the data address.

5. The computer system of claim 4 wherein the pair of bits comprises the first and second least significant bits appended to the data address.

6. The computer system of claims 1, 2, 3, 4 or 5 wherein the plurality of data byte storage locations comprise four storage locations and the plurality of valid bits comprise four bits.

* * * * *